US010592733B1

(12) United States Patent
Ramanarayanan et al.

(10) Patent No.: US 10,592,733 B1
(45) Date of Patent: Mar. 17, 2020

(54) COMPUTER-IMPLEMENTED SYSTEMS AND METHODS FOR EVALUATING SPEECH DIALOG SYSTEM ENGAGEMENT VIA VIDEO (71) Applicant: Educational Testing Service, Princeton, NJ (US)

(72) Inventors: Vikram Ramanarayanan, San Francisco, CA (US); David Suendermann-Oeft, San Francisco, CA (US); Patrick Lange, San Francisco, CA (US); Alexei V. Ivanov, Redwood City, CA (US); Keelan Evanini, Pennington, NJ (US); Yao Qian, San Francisco, CA (US); Eugene Tsuprun, Hillsborough, NJ (US); Hillary R. Molloy, San Francisco, CA (US)

(73) Assignee: Educational Testing Service, Princeton, NJ (US)

( * ) Notice: Subject to any disclaimer, the term of this patent is extended or adjusted under 35 U.S.C. 154(b) by 48 days.

(21) Appl. No.: 15/600,206

(22) Filed: May 19, 2017

Related U.S. Application Data

(60) Provisional application No. 62/339,143, filed on May 20, 2016.

(51) Int. Cl.
| | |
|---|---|
| *G10L 15/00* | (2013.01) |
| *G06K 9/00* | (2006.01) |
| *G10L 15/25* | (2013.01) |
| *G10L 15/22* | (2006.01) |
| *G10L 15/02* | (2006.01) |
| *G10L 15/30* | (2013.01) |

(52) U.S. Cl.
 CPC ..... *G06K 9/00335* (2013.01); *G06K 9/00355* (2013.01); *G10L 15/005* (2013.01); *G10L 15/22* (2013.01); *G10L 15/25* (2013.01); *G10L 15/02* (2013.01); *G10L 15/30* (2013.01)

(58) Field of Classification Search
 CPC combination set(s) only.
 See application file for complete search history.

(56) References Cited

U.S. PATENT DOCUMENTS

| | | | | |
|---|---|---|---|---|
| 6,731,307 | B1 * | 5/2004 | Strubbe | G06N 3/004 704/E17.002 |
| 9,300,790 | B2 * | 3/2016 | Gainsboro | H04M 3/2281 |

(Continued)

OTHER PUBLICATIONS

Chen, Lei, Yoon, Su-Youn; Application of Structural Events Detected on ASR Outputs for Automated Speaking Assessment; Interspeech; 2012.

(Continued)

*Primary Examiner* — Vu B Hang
(74) *Attorney, Agent, or Firm* — Jones Day (57) ABSTRACT

Systems and methods are provided providing a spoken dialog system. Output is provided from a spoken dialog system that determines audio responses to a person based on recognized speech content from the person during a conversation between the person and the spoken dialog system. Video data associated with the person interacting with the spoken dialog system is received. A video engagement metric is derived from the video data, where the video engagement metric indicates a level of the person's engagement with the spoken dialog system.

24 Claims, 8 Drawing Sheets (56) References Cited

U.S. PATENT DOCUMENTS

| | | | | |
|---|---|---|---|---|
| 9,548,048 | B1* | 1/2017 | Solh | G06K 9/00335 |
| 10,098,569 | B2* | 10/2018 | Abeyratne | A61B 7/003 |
| 2011/0274257 | A1* | 11/2011 | Vaananen | G06F 17/30864 |
| | | | | 379/93.01 |

OTHER PUBLICATIONS

Chen, Lei, Zechner, Klaus; Applying Rhythm Features to Automatically Assess Non-Native Speech; Interspeech; pp. 1861-1864; 2011.

Chen, Lei, Zechner, Klaus, XI, Xiaoming; Improved Pronunciation Features for Construct-Driven Assessment of Non-Native Spontaneous Speech; Human Language Technologies: The 2009 Annual Conference of the North American Chapter of the ACL; pp. 442-449; Jun. 2009.

Chen, Lei, Tetreault, Joel, Xi, Xiaoming; Towards Using Structural Events to Assess Non-Native Speech; Proceedings of the NAACL HLT 2010 Fifth Workshop on Innovative Use of NLP for Building Educational Applications; pp. 74-79; 2010.

Csurka, Gabriella, Dance, Christopher, Fan, Lixin, Willamowski, Jutta, Bray, Cedric; Visual Categorization with Bags of Keypoints; Workshop on Statistical Learning in Computer Vision, ECCV, 1; 2004.

Danieli, Morena, Gerbino, Elisabetta; Metrics for Evaluating Dialogue Strategies in a Spoken Language System; Proceedings of the 1995 AAAI Spring Symposium on Empirical Methods in Discourse Interpretation and Generation, 16; pp. 34-39; 1995.

Evanini, Keelan, Hunter, Phillip, Liscombe, Jackson, Suendermann, David, Pieraccini, Roberto; Caller Experience: A Method for Evaluating Dialog Systems and Its Automatic Prediction; IEEE Spoken Language technology Workshop; pp. 129-132; 2008.

Eyben, Florian, Wollmer, Martin, Schuller, Bjorn; OpenSMILE: the Munich Versatile and Fast Open-Source Audio Feature Extractor; Institute for Human-Machine Communications, 1(1); Oct. 2010.

Eyben, Florian, Weninger, Felix, Gross, Florian, Schuller, Bjorn; Recent Developments in openSMILE, the Munich Open-Source Multimedia Feature Extractor; Proceedings of the 21st ACM International Conference on Multimedia; pp. 835-838; 2013.

Forbes-Riley, Kate, Litman, Diane; Predicting Emotion in Spoken Dialogue from Multiple Knowledge Sources; HLT-NAACL; pp. 201-208; 2004.

Forbes-Riley, Kate, Litman, Diane; Benefits and Challenges of Real-Time Uncertainty Detection and Adaptation in a Spoken Dialogue Computer Tutor; Speech Communication, 53(9-10); pp. 1115-1136; 2011.

Forsyth, David, Ponce, Jean; Computer Vision: a Modern Approach; Prentice Hall: New York, NY; 2011.

Higgins, Derrick; Xi, Xiaoming, Zechner, Klaus, Williamson, David; A Three-Stage Approach to the Automated Scoring of Spontaneous Spoken Responses; Computer Speech and Language, 25; pp. 282-306; 2011.

Jeon, Je Hun, Yoon, Su-Youn; Acoustic Feature-Based Non-Scorable Response Detection for an Automated Speaking Proficiency Assessment; Proceedings 13th Annual Conference of the International Speech Communication Association, Interspeech; Portland, OR; Sep. 2012.

Jiang, Jiepu, Awadallah, Ahmed Hassan, Jones, Rosie, Ozertem, Umut, Zitouni, Imed, Kulkarni, Ranjitha Gurunath, Khan, Omar Zia; Automatic Online Evaluation of Intelligent Assistants; Proceedings of the 24th International World Wide Web Conferences Steering Committee; May 2015.

Jurcicek, Filip, Keizer, Simon, Gasic, Milica, Mairesse, Francois, Thomson, Blaise, Yu, Kai, Young, Steve; Real User Evaluation of Spoken Dialogue Systems Using Amazon Mechanical Turk; Proceedings of Interspeech; pp. 3061-3064; 2011.

McGraw, Ian, Lee, Chia-ying, Hetherington, Lee, Seneff, Stephanie, Glass, James; Collecting Voices from the Cloud; LREC; pp. 1576-1583; 2010.

Moller, Sebastian; Quality of Telephone-Based Spoken Dialogue Systems; Springer Science and Business Media; 2005.

Pedregosa, Fabian, Varoquaux, Gael, Gramfort, Alexandre, Michel, Vincent, Thirion, Bertrand, Grisel, Olivier, Blondel, Mathieu, Prettenhofer, Peter, Weiss, Ron, Dubourg, Vincent, Vanderplas, Jake, Passos, Alexandre, Cournapeau, David, Brucher, Matthieu, Perrot, Matthieu, Duchesnay, Edouard; Scikit-learn: Machine Learning in Python; Journal of Machine Learning Research, 12; pp. 2825-2830; 2011.

Pietquin, Olivier, Hastie, Helen; A Survey on Metrics for the Evaluation of User Simulations; The Knowledge Engineering Review; pp. 1-15; 2012.

Ramanarayanan, Vikram, Suendermann-Oeft, David, Lange, Patrick, Mundkowsky, Robert, Ivanov, Alexei, Yu, Zhou, Qian, Yao, Evanini, Keelan; Assembling the Jigsaw: How Multiple Open Standards are Synergistically Combined in the HALEF Multimodal Dialog System; Ch. 13 in Multimodal Interaction with W3C Standards: Towards Natural User Interfaces to Everything; Springer; pp. 295-310; 2016.

Rayner, Manny, Frank, Ian, Chua, Cathy, Tsourakis, Nikos, Bouillon, Pierrette; For a Fistful of Dollars: Using Crowd-Sourcing to Evaluate a Spoken Language CALL Application; Proceedings of the SLaTE Workshop; Aug. 2011.

Schmitt, Alexander, Schatz, Benjamin, Minker, Wolfgang; Modeling and Predicting Quality in Spoken Human-Computer Interactions; Proceedings of the 12th Annual Meeting of the Special Interest Group on Discourse and Dialogue; pp. 173-184; Jun. 2011.

Scovanner, Paul, Ali, Saad, Shah, Mubarak; A 3-Dimensional SIFT Descriptor and its Application to Action Recognition; Proceedings of the 15th International Conference on Multimedia; pp. 357-360; 2007.

Suendermann, David, Liscombe, Jackson, Pieraccini, Roberto, Evanini, Keelan; How Am I Doing?: A New Framework to Effectively Measure the Performance of Automated Customer Care Contact Centers; Ch. 7 in Advances in Speech Recognition: Mobile Environments, A. Neustein (Ed.); Springer; pp. 155-179; Aug. 2010.

Suendermann-Oeft, David, Ramanarayanan, Vikram, Teckenbrock, Moritz, Neutatz, Felix, Schmidt, Dennis; Halef: An Open-Source Standard-Compliant Telephony-Based Modular Spoken Dialog System—A Review and an Outlook; Proceedings of the International Workshop on Spoken Dialog Systems; Jan. 2015.

Vedaldi, Andrea, Fulkerson, Brian; VLFeat: an Open and Portable Library of Computer Vision Algorithms; Proceedings of the 18th ACM International Conference on Multimedia; pp. 1469-1472; 2010.

Walker, Marilyn, Litman, Diane, Kamm, Candace, Abella, Alicia; Paradise: A Framework for Evaluating Spoken Dialogue Agents; Proceedings of the 8th Conference, European Chapter of the Association for Computational Linguistics; pp. 271-280; 1997.

Walker, Marilyn, Wright, Jerry, Langkilde, Irene; Using Natural Language Processing and Discourse Features to Identify Understanding Errors in a Spoken Dialogue System; Proceedings of the 17th International Conference on Machine Learning; pp. 1111-1118; 2000.

Weinland, Daniel, Ronfard, Remi, Boyer, Edmond; A Survey of Vision-Based Methods for Action Representation, Segmentation and Recognition; Computer Vision and Image Understanding, 115(2); pp. 224-241; Feb. 2011.

Witt, Silke; Use of Speech Recognition in Computer-Assisted Language Learning; Unpublished Dissertation, Cambridge University Engineering Department; Cambridge, UK; 1999.

Yang, Zhaojun, Levow, Gina-Anna, Meng, Helen; Predicting User Satisfaction in Spoken Dialog System Evaluation With Collaborative Filtering; IEEE Journal of Selected Topics in Signal Processing, 6(8); pp. 971-981; Dec. 2012.

Yu, Zhou, Ramanarayanan, Vikram, Mundkowsky, Robert, Lange, Patrick, Ivanov, Alexei, Black, Alan, Suendermann-Oeft, David; Multimodal Halef: An Open-Source Modular Web-Based Multimodal Dialog Framework; IWSDS Conference; 2016.

Zechner, Klaus, Higgins, Derrick, Xi, Xiaoming, Williamson, David; Automatic Scoring of Non-Native Spontaneous Speech in (56) References Cited

OTHER PUBLICATIONS

Tests of Spoken English; Speech Communication, 51(10); pp. 883-895; Oct. 2009.

* cited by examiner

FIG. 1

| Rating | Description | Caller | Expert |
|---|---|---|---|
| Caller experience | A qualitative measure of the caller's experience using the automated agent, with 1 for a very bad experience and 5 for a very good experience. | ✓ | ✓ |
| Caller engagement | A qualitative measure of caller's engagement with the task or the system, ranging from highly disengaged to highly engaged. | ✓ | ✓ |
| Intelligibility of system responses | This metric measures, on a scale from 1 to 5, how clear the automated agent is. A poor audio quality rating would be marked by frequent dropping in and out of the automated agent's voice or by muffled or garbled audio. | ✓ | |
| Audio quality of caller responses | This metric measures, on a scale from 1 to 5, how clear the caller audio is. A poor audio quality rating would be marked by user responses dropping in and out of the call or being muffled, garbled, echoing, or inaudible. | | ✓ |
| Video quality of caller responses | This metric measures, on a scale from 1 to 5, the video quality of the call. A poor quality rating here would involve issues with lighting, other problems with the video (such as pixilation, blocking artifacts, nonconstant background), and if the user's head is not located in the center of the image as instructed in the caller guidelines. | | ✓ |
| Qualitative latency score | Measures perceived system response time. How debilitating is the average delay between the automated agent's response from the time the user finishes speaking to the conversation? | ✓ | ✓ |
| Caller cooperation | A qualitative measure of caller's cooperation, or the caller's willingness to interact with the automated agent, with 1 for no cooperation and 5 for fully cooperative. | | ✓ |
| System performance | A qualitative measure of how the system performed as per caller expectations and whether the system responses were appropriate. | ✓ | |
| System understanding degree | A qualitative measure of how well the system "understood" the caller. | ✓ | |

| Category | Subcategory | No. of features | Example features |
|---|---|---|---|
| Prosody | Fluency | 24 | This category includes features based on the number of words per second, number of words per chunk, number of silences, average duration of silences, frequency of long pauses (≥0.5 s), and number of filled pauses (uh and um). See Zechner, Higgins, Xi, and Williamson (2009) for detailed descriptions of these features. |
| | Intonation and stress | 11 | This category includes basic descriptive statistics (mean, minimum, maximum, range, standard deviation) for the pitch and power measurements for the utterance. |
| | Rhythm | 26 | This category includes features based on the distribution of prosodic events (prominences and boundary tones) in an utterance as detected by a statistical classifier (overall percentages of prosodic events, mean distance between events, mean deviation of distance between events; Zechner et al., 2009) as well as features based on the distribution of vowel, consonant, and syllable durations (overall percentages, standard deviation, and Pairwise Variability Index; Chen & Zechner, 2011). |
| Pronunciation | Likelihood based | 8 | This category includes features based on the acoustic model likelihood scores generated during forced alignment with a native speaker acoustic model (Chen et al., 2009). |
| | Confidence based | 2 | This category includes two features based on the ASR confidence score: the average word-level confidence score and the time-weighted average word-level confidence score (Higgins, Xi, Zechner, & Williamson, 2011). |
| | Duration | 1 | This category includes a feature that measures the average difference between the vowel durations in the utterance and vowel-specific means based on a corpus of native speech (Chen et al., 2009). |
| Grammar | Location of disfluencies | 6 | This category includes features based on the frequency of between-clause silences and edit disfluencies compared to within-clause silences and edit disfluencies (Chen, Tetreault, & Xi, 2010; Chen & Yoon, 2012). |
| Audio quality | -- | 2 | This category includes two scores based on MFCC features that assess the probability that the audio file has audio quality problems or does not contain speech input (Jeon & Yoon, 2012). |

FIG. 4

| | Majority vote | crowdbase2010 | | | | | | | | crowdbase | | | | | | | | SpeechRater | | | | | | | |
|---|---|---|---|---|---|---|---|---|---|---|---|---|---|---|---|---|---|---|---|---|---|---|---|---|---|
| Rating | baseline | SVC | KNN | DT | GB | AB | RF | SVC | KNN | DT | GB | AB | RF | SVC | KNN | DT | GB | AB | RF |
| Caller | | | | | | | | | | | | | | | | | | | |
| Call experience | 35.5 | 31.8 | 30.1 | 31.3 | 38.2 | 34.2 | 40.5 | 30.5 | 28.4 | 31.9 | 37.3 | 33.4 | 40.0 | 28.0 | 27.8 | 28.0 | 34.0 | 33.4 | 36.4 |
| Intelligibility | 65.2 | 42.2 | 57.2 | 58.7 | 64.8 | 47.2 | 66.8 | 46.4 | 56.0 | 50.6 | 64.6 | 46.0 | 66.7 | 58.5 | 56.5 | 49.2 | 63.4 | 48.5 | 65.3 |
| Engagement | 34.2 | 33.0 | 28.5 | 29.9 | 38.1 | 33.1 | 40.9 | 26.3 | 27.3 | 30.0 | 37.9 | 34.1 | 40.7 | 28.4 | 28.1 | 28.3 | 32.9 | 31.2 | 36.0 |
| System performance | 32.4 | 28.3 | 29.1 | 30.9 | 37.6 | 32.7 | 40.2 | 24.4 | 22.5 | 30.6 | 37.3 | 34.3 | 40.1 | 25.9 | 27.8 | 27.8 | 34.1 | 32.8 | 35.5 |
| Expert (pizza) | | | | | | | | | | | | | | | | | | | |
| Caller experience | 30.1 | 25.7 | 27.1 | 27.7 | 34.5 | 30.0 | 35.2 | 28.6 | 27.5 | 27.3 | 34.2 | 31.6 | 35.6 | 25.6 | 27.3 | 26.8 | 30.5 | 26.8 | 35.4 |
| Caller engagement | 33.0 | 28.2 | 27.9 | 29.3 | 31.1 | 30.0 | 33.3 | 25.6 | 27.7 | 28.8 | 31.3 | 28.7 | 32.0 | 28.8 | 28.0 | 28.1 | 31.3 | 29.1 | 36.4 |
| Caller cooperation | 45.3 | 41.6 | 42.3 | 42.1 | 43.1 | 41.0 | 45.9 | 37.9 | 39.6 | 40.2 | 42.6 | 39.6 | 46.5 | 34.8 | 40.1 | 36.4 | 42.4 | 27.7 | 45.5 |
| Audio quality | 34.6 | 24.6 | 32.7 | 34.3 | 39.8 | 33.3 | 41.9 | 30.3 | 28.7 | 32.2 | 39.0 | 37.1 | 39.5 | 29.9 | 30.3 | 29.2 | 34.8 | 28.1 | 37.4 |

Note. AB = AdaBoost; DT = decision trees; GB = gradient boosting; KNN = K nearest neighbor; RF = random forests; SVC = linear support vector classifier machines. The best performing systems are highlighted in bold.

FIG. 5A

| | Classifier accuracy | | | |
|---|---|---|---|---|
| Rating | Forced-offer | Interview | Pizza | Meetings | Overall |
| Call experience | 30.6 | 40.6 | 38.1 | 45.5 | 40.5 |
| Intelligibility | 68.8 | 66.0 | 61.5 | 78.1 | 66.8 |
| Engagement | 35.1 | 46.0 | 35.4 | 46.1 | 40.9 |
| System performance | 38.0 | 40.0 | 36.5 | 45.3 | 40.2 |

FIG. 5B

| Rating | Majority vote baseline | Audio (correlates2010) features only | | | | | | | Video features only | | | | | | | Fused video and audio features | | | | | | |
|---|---|---|---|---|---|---|---|---|---|---|---|---|---|---|---|---|---|---|---|---|---|---|
| | | SVC | KNN | DT | GB | AB | RF | SVC | KNN | DT | GB | AB | RF | SVC | KNN | DT | GB | AB | RF |
| Caller | | | | | | | | | | | | | | | | | | | | |
| Call experience | 36.9 | 28.2 | 27.7 | 32.2 | 37.9 | 31.7 | 40.9 | 31.8 | 29.5 | 26.5 | 32.0 | 28.7 | 36.5 | 29.6 | 27.8 | 33.0 | 37.5 | 30.6 | 41.9 |
| Intelligibility | 68.0 | 64.2 | 59.9 | 56.3 | 67.2 | 60.1 | 60.9 | 66.2 | 60.4 | 53.0 | 62.1 | 63.9 | 63.6 | 61.0 | 59.9 | 56.4 | 66.3 | 64.2 | 69.6 |
| Engagement | 34.3 | 29.5 | 31.4 | 28.9 | 41.0 | 35.4 | 42.8 | 33.0 | 28.5 | 29.9 | 38.1 | 33.1 | 40.9 | 32.2 | 31.4 | 31.0 | 41.2 | 36.6 | 41.8 |
| System performance | 34.6 | 27.4 | 28.8 | 29.9 | 39.4 | 34.0 | 41.8 | 28.3 | 29.1 | 30.9 | 37.6 | 32.7 | 40.2 | 27.1 | 28.8 | 29.4 | 37.5 | 32.7 | 42.3 |
| Expert (pizza only) | | | | | | | | | | | | | | | | | | | | |
| Caller experience | 29.1 | 33.6 | 33.3 | 30.2 | 34.3 | 32.3 | 37.7 | 24.8 | 24.1 | 27.9 | 20.9 | 29.6 | 33.1 | 36.0 | 33.3 | 24.6 | 40.7 | 32.3 | 37.9 |
| Caller engagement | 32.7 | 25.3 | 27.4 | 42.5 | 37.0 | 32.2 | 31.5 | 22.9 | 24.0 | 31.9 | 24.0 | 27.4 | 29.5 | 21.2 | 27.4 | 40.4 | 37.0 | 33.6 | 37.7 |
| Caller cooperation | 43.4 | 38.5 | 46.6 | 39.0 | 40.4 | 38.4 | 44.6 | 35.6 | 41.1 | 38.5 | 37.7 | 45.1 | 45.2 | 38.3 | 46.6 | 46.6 | 36.3 | 39.1 | 41.8 |
| Audio quality | 37.1 | 39.8 | 26.4 | 35.7 | 39.6 | 30.2 | 40.2 | — | — | — | — | — | — | — | — | — | — | — | — |
| Video quality | 37.7 | | | | | | | 25.9 | 31.2 | 32.1 | 39.3 | 21.7 | 39.8 | | | | | | |

Note. AB = AdaBoost; DT = decision trees; GB = gradient boosting; KNN = K nearest neighbors; RF = random forests; SVC = linear support vector classifier machines. The best-performing systems are highlighted in bold.

COMPUTER-IMPLEMENTED SYSTEMS AND METHODS FOR EVALUATING SPEECH DIALOG SYSTEM ENGAGEMENT VIA VIDEO

CROSS-REFERENCE TO RELATED APPLICATIONS

This application claims priority to U.S. Provisional Application No. 62/339,143, entitled "Using Vision and Speech Features for Automated Prediction of Performance Metrics in Multimodal Dialogs," filed May 20, 2016, the entirety of which is incorporated herein by reference.

FIELD

The technology described in this patent document relates generally to speech dialog systems and more particularly to measuring an engagement level of a person interacting with a speech dialog system.

BACKGROUND

Speech dialog systems are useful in a variety of contexts, where desirable fields for their implementation continue to grow. A speech dialog system (e.g., an automatic call routing system, an interview pre-screening system) captures audio responses from a person interacting with the speech dialog system and extracts content from those audio responses (e.g., via automatic speech recognition). The speech dialog system provides responsive output based on that extracted content, resulting in a conversation between the person and the speech dialog system (e.g., an avatar depicted on a screen, a voice transmitted over a telephone line).

It is often desirable to measure a level of engagement of the person interacting with the speech dialog system. That engagement level can be useful for gauging the level of effort being given by the person in interacting with the system (e.g., in a job interview pre-screening implementation). Or the engagement level can be used to adjust the spoken dialog system to increase the engagement level, either during the conversation or after the conversation so that future conversations achieve a higher level of engagement. The ability to measure a user experience and performance metrics for a spoken dialog system, either at the time of rollout or for a mature system, is important. For example, it can be especially important for spoken dialog systems used in the educational domain, where language learning and assessment applications require systems that deal gracefully with nonnative speech and varying cultural contexts.

SUMMARY

Systems and methods are provided providing a spoken dialog system. Output is provided from a spoken dialog system that determines audio responses to a person based on recognized speech content from the person during a conversation between the person and the spoken dialog system. Video data associated with the person interacting with the spoken dialog system is received. A video engagement metric is derived from the video data, where the video engagement metric indicates a level of the person's engagement with the spoken dialog system, and where the video engagement metric is not indicative of a level of correctness of any speech content received from the person.

As another example, a system for providing a spoken dialog system includes a processing system and a computer-readable medium encoded with instructions for commanding the processing system to execute steps of a method. In the method, output is provided from a spoken dialog system that determines audio responses to a person based on recognized speech content from the person during a conversation between the person and the spoken dialog system. Video data associated with the person interacting with the spoken dialog system is received. A video engagement metric is derived from the video data, where the video engagement metric indicates a level of the person's engagement with the spoken dialog system, and where the video engagement metric is not indicative of a level of correctness of any speech content received from the person.

As a further example, a non-transitory computer-readable medium is encoded with instructions for commanding a processing system to execute steps of a method for providing a spoken dialog system. In the method, output is provided from a spoken dialog system that determines audio responses to a person based on recognized speech content from the person during a conversation between the person and the spoken dialog system. Video data associated with the person interacting with the spoken dialog system is received. A video engagement metric is derived from the video data, where the video engagement metric indicates a level of the person's engagement with the spoken dialog system, and where the video engagement metric is not indicative of a level of correctness of any speech content received from the person.

BRIEF DESCRIPTION OF THE DRAWINGS

FIG. 2 is a diagram depicting example engagement-directed survey questions asked regarding a person's interactions with a directed telephone spoken dialog system and the party to which those questions were asked.

FIG. 4 is a diagram depicting specific categories of speech features extracted as audio features in one example.

DETAILED DESCRIPTION

Figure 1:
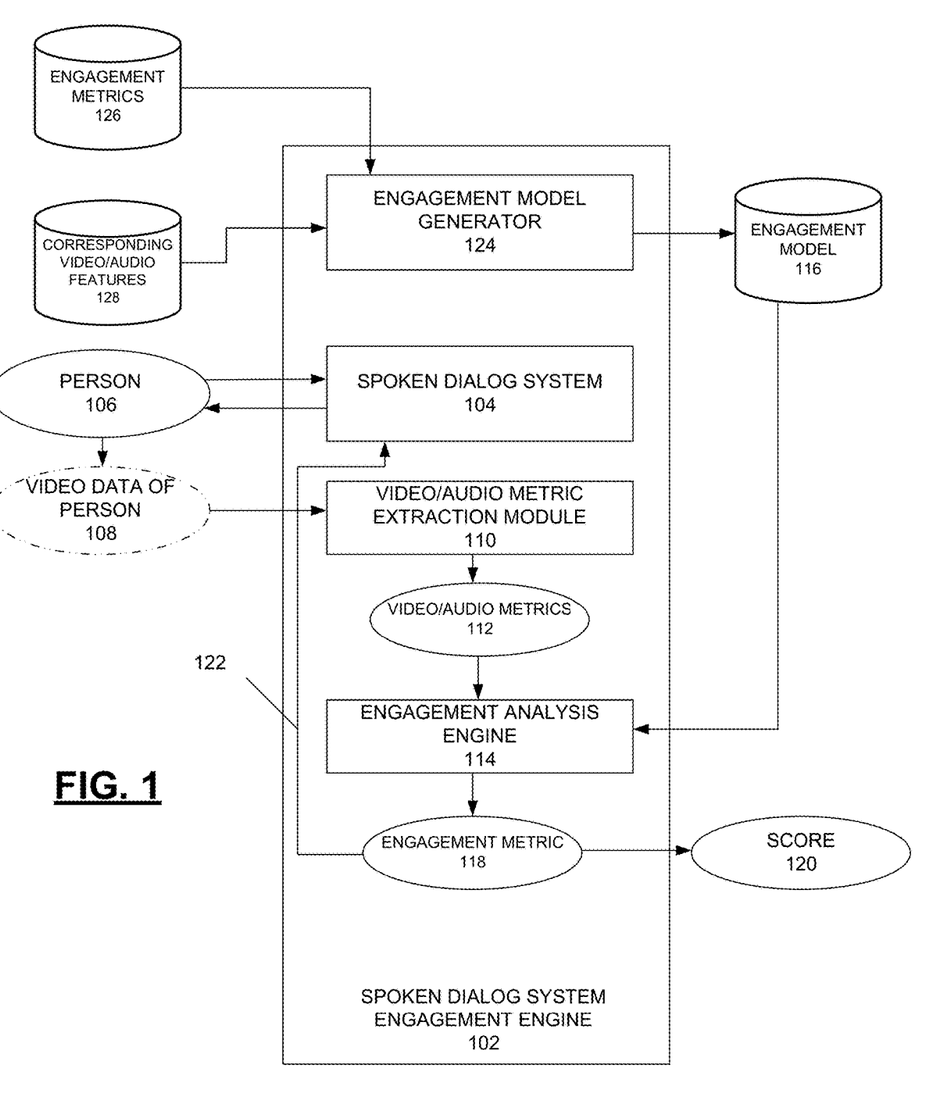
FIG. 1 is a block diagram depicting a processor implemented spoken dialog system engagement engine.

FIG. 1 is a block diagram depicting a processor implemented spoken dialog system engagement engine. The engagement engine 102 includes a spoken dialog system 104 that is configured to interact with a person 106 in a conversational fashion. For example, the spoken dialog system 104 may prompt the person 106 for an initial utterance or the spoken dialog system 104 may react to initial speech from the person 106. The spoken dialog receives audio and/or video data representing speech from the person 106. That data is processed in order to identify a next output from the spoken dialog system 104 to the person 106 in the conversation (e.g., using a conversation tree data structure).

It may be desirable to measure the engagement level of the person 106 interacting with the spoken dialog system 104 in a variety of contexts. In one example, where the spoken dialog system 104 is presented to inform or entertain the person 106 (e.g., as an avatar displayed on a screen and speaking through a speaker), the engagement level of the person 106 may indicate whether the person is interested in the conversation or whether they are distracted or bored. The spoken dialog system engagement engine 102 is typically designed to measure the engagement of the person 106 in interacting with the spoken dialog system 104, rather than a correctness of answers given by the person 106. Thus, the engine 102 detects a level of connection between the person 106 with the spoken dialog system 104 (e.g., is the person interested, is the person distracted) rather than the quality of the content of the communications of the person 106. The detected level of engagement can be used alone or in combination with other features (e.g., features indicative of substantive quality of responses of the person 106) to determine a variety of metrics for the person 106 or system 104.

If the detected level of engagement during a conversation is low, the spoken dialog system could adjust during that conversation to try to better interest the person 106. The spoken dialog system 104 could adjust to present a more excited personality or could change displayed content (e.g., to present an interesting picture or video to try to recapture the attention of the person). The spoken dialog system 104 can also use the detected engagement level to adjust its logic after the conversation so that future conversations (e.g., with other persons) might be more interesting. For example, upon investigation of a detected low engagement level for a conversation, a flaw in the conversation tree data structure may be discovered that led to the spoken dialog system 104 providing nonsensical replies to the person 106. That flaw could be remedied so that future traversals of the conversation tree data structure result in a more engaging conversation.

The detected level of engagement level can also be used to evaluate the person 106. For example, where the spoken dialog system 104 is provided to the person as part of a job interview pre-screening process, the level of engagement of the person 106 in the conversation with the spoken dialog system 104 (e.g., a displayed avatar) can be used as a proxy to estimate the level of interest and enthusiasm that the person 106 has in the job for which he is applying. Interest and enthusiasm are often considered desirable traits during an interview. The level of detected engagement, alone or in combination with other detected and calculated metrics, can be used to determine whether the person 106 should be called back for a second interview (e.g., with a live person).

The spoken dialog system engagement engine 102 uses video and possibly audio 108 of the person 106 interacting with the spoken dialog system to measure the level of engagement. While the spoken dialog system 104 interacts with the person 106, video data is captured, such as via a web camera and microphone associated with a computer that the person 106 is operating. A video/audio metric extraction module 110 parses the video data 110 to extract video/audio metrics 112. An engagement analysis engine 114 receives the video/audio metrics 112 and an engagement model accessed from a repository 116. The engagement analysis engine 114 inputs the video/audio metrics 112 to the model from 116 to calculate one or more engagement metrics 118. As discussed above, the engagement metric can be used to determine a score 120 indicative of the performance of the person 106 in the conversation. The engagement metric 118 can also or alternatively be used as feedback (as indicated at 122) for the spoken dialog system 104, as described above, to modify the spoken dialog system live, during the conversation, or later after the conversation is complete.

In addition to depicting functionality for evaluation of spoken dialog system engagement, FIG. 1 also depicts an engagement model generator 124 that is configured to train and maintain the engagement models 116 used by the engagement analysis engine 114. The engagement model generator is configured to create a model that uses the video/audio metrics 112 to estimate engagement metrics, such as engagement metrics that traditionally have been acquired via surveys of the person 106 interacting with the spoken dialog system 104 or surveys of an observer who is watching the conversation live or a recording of the conversation. In order to train an engagement model 116 the engagement model generator 124 accesses a repository of historic engagement metrics 126 from prior interactions with spoken dialog systems that correspond with the engagement metrics 118 desired to be output by the model. The model generator 124 further accesses captured video/audio features 128 that correspond to the interactions characterized by the engagement metrics at 126. Those two inputs 126, 128 are analyzed by the engagement model generator 124 as described in further detail herein to identify correlations between video/audio features 128 and the resulting engagement metrics 126 to form the engagement model 116.

Figure 3:
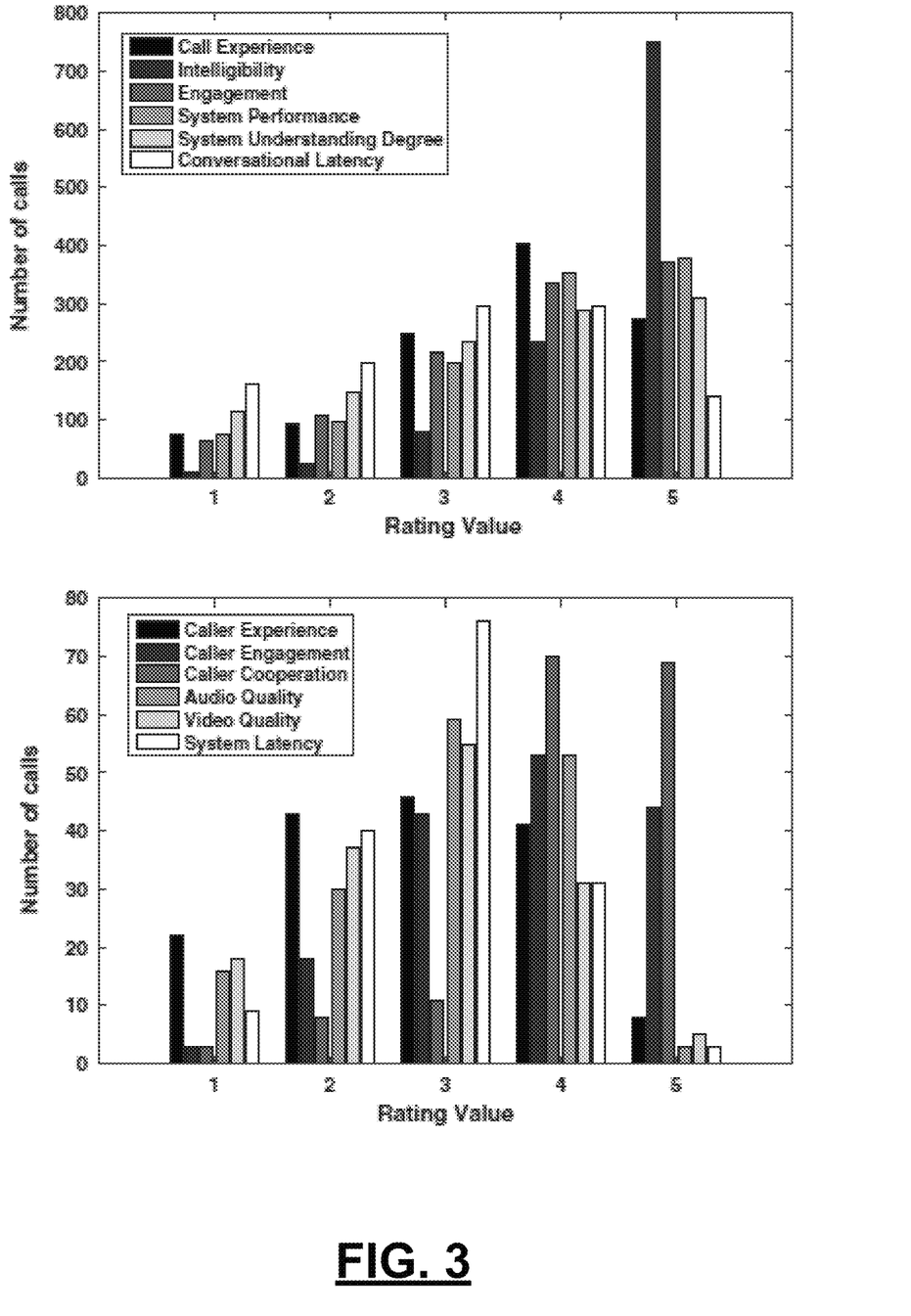
FIG. 3 provides histograms of ratings on a scale of 1-5, with 5 being the highest, of user perceived engagement levels for different subsets of engagement in the top chart, and third-party observer perceived engagement for those same subsets of engagement in the bottom chart.

As noted above, the engagement model 116 seeks to estimate engagement parameters of the person 106, where those engagement parameters have traditionally been measured by surveys. In one strategy, intrinsic measurement of engagement (i.e., the level of engagement perceived by the person 106) is measured by asking questions to the person 106. Additionally, or alternatively, an external measurement of engagement (i.e., the level of engagement detected by a third party observing the conversation) is measured by asking questions to a third party watching the conversation live or a video or audio recording of the conversation. A variety of questions may be asked to the person 106 and/or the observing third party. The questions asked of either group can vary, in one example, where certain engagement metrics are more easily observed by one group or the other. For example, it may be difficult for the person 106 to answer questions regarding the audio quality of the person's responses, where the third party may be a more appropriate party to ask about that metric that can be indicative of the person's engagement (e.g., quiet, unintelligible answers may be indicative of low levels of engagement). Conversely, it may be appropriate to ask questions regarding the intelligibility of the spoken dialog system 104 to the person 106 because it is the person's perception of that intelligibility that is relevant. FIG. 2 is a diagram depicting example engagement-directed survey questions asked regarding a person's interactions with a directed telephone spoken dialog system and the party (i.e., the person 106 or the observing third party) to which those questions were asked. These types of responses populate the engagement metrics repository 126. FIG. 3 provides example histograms of ratings on a scale of 1-5, with 5 being the highest, of user perceived engagement levels for different subsets of engagement in the top chart, and third-party observer perceived engagement for those same subsets of engagement in the bottom chart.

The corresponding video/audio features repository 128 contains extracted video/audio metrics (similar to those extracted at 112) or raw video/audio (similar to that captured at 108) from which correlations with the measured engagement levels stored in the engagement metrics repository 126 can be derived. In one example, both speech and visual features can be extracted from recordings of a conversation between a person and a spoken dialog system.

Regarding speech features, in one embodiment, an OpenSMILE engine was used to extract features from the audio signal, specifically, the standard openEAR emobase and emobase2010 feature sets containing 988 and 1,582 features, respectively, which are tuned for recognition of paralinguistic information in speech. These consist of multiple low-level descriptors—intensity, loudness, mel-frequency cepstral coefficients (MFCCs), pitch, voicing probability, F0 envelope, line spectral frequencies, and zero crossing rate, among others—as well as their functionals (such as standard moments). These feature sets have been shown to be comprehensive and effective for capturing paralinguistic information in various standard tasks The system also considered features that are currently used in automated speech scoring research, covering diverse measurements among lexical usage, fluency, pronunciation, prosody, and so on. In particular, a SpeechRater Automated Scoring service, a speech rating system that processes speech and its associated transcription to generate a series of features on the multiple dimensions of speaking skills, for example, speaking rate, prosodic variations, pausing profile, and pronunciation, which is typically measured by goodness of pronunciation or its derivatives. FIG. 4 is a diagram depicting specific categories of speech features extracted as audio features in one example.

A wide variety of visual features may be used in determining a level of engagement of a person interacting with a spoken dialog system. For example, a feature related to a direction that eyes are looking can be used to estimate whether the person is paying attention to any graphics (e.g., an avatar) displayed as part of the spoken dialog system. Eye-rolling or prolonged eye closure can also be detected and utilized as an indicator of low engagement. Visual features associated with movement the head (e.g., bobbing) eyes, nose, mouth (e.g., yawning), ears, or hands (e.g., gesturing) can be extracted and utilized in determining a level of engagement.

One example visual feature can be used that takes into account the spatiotemporal relationships between pixels and pixel regions in the sequence of images. Such a feature explicitly captures spatiotemporal relationships in the image sequence for the subsequent classification task. This feature uses 3D Scale-Invariant Feature Transform (SIFT) descriptors to represent videos in a bag-of-visual-words approach. Such a feature, in one example, can be extracted as follows:

1. For each video in the data set, use ffmpeg3 (or similar software) to extract image frames at a desired frame rate (e.g., one frame/s to capture macro-level behavioral patterns over the entire video. This can be converted into a 3D video matrix by concatenating all image frames.

2. Remove outlier frames, that is, any frame that is more than 3 standard deviations away from the mean image.

3. Select N interest points at random (e.g., 50 descriptors).

4. Extract N 3D SIFT features for each video in the data set.

5. Use a held-out portion of the data set to quantize the 3D SIFT descriptors into K clusters using K-means clustering (e.g., 64 clusters).

6. Assign cluster labels to all SIFT descriptors computed for other videos in the data set using K-nearest-neighbor (KNN) clustering.

7. For each video, compute the histogram of cluster labels (also called a "signature"), which measures the number of analyzed frames of a video that one of the N descriptors (e.g., a nose, an ear, a hand) appears, and use this as a K-dimensional feature descriptor for the video. Using such a histogram of cluster labels is more robust than using the raw 3D SIFT features and also allows us to build a more discriminative representation of a video, because some spatiotemporal patterns can occur in some videos more than others.

Having accessed the engagement metrics 126 and the corresponding video/audio features 128, the engagement model generator 124 analyzes those two sets of data concurrently to identify correlations among the video/audio features and the corresponding engagement metrics to form the engagement model 116.

In one example, the engagement model generator 124 was implemented using SKLL, an open-source Python package that wraps around the scikit-learn package, to perform machine learning experiments. The generator 124 experimented with a variety of learners to predict the various performance metric scores (as detailed below), including support vector classifiers (SVC), tree-based classifiers, and boosting-based classifiers, using prediction accuracy as an objective function for optimizing classifier performance. The engagement model generator 124 ran stratified 10-fold cross-validation experiments, where folds were generated to preserve the percentage of samples in each class. The engagement model generator 124 performed two sets of experiments. The first examined audio files at the dialog turn level, as opposed to the full-call level, to enable automatic prediction of engagement scores given only audio information from a single turn. Such functionality could then eventually be integrated with dialog management routines to choose an appropriate next action based on the current caller experience or caller engagement rating, for example. The second set of experiments looked at both audio and video files at the level of the full call.

Figure 5A:
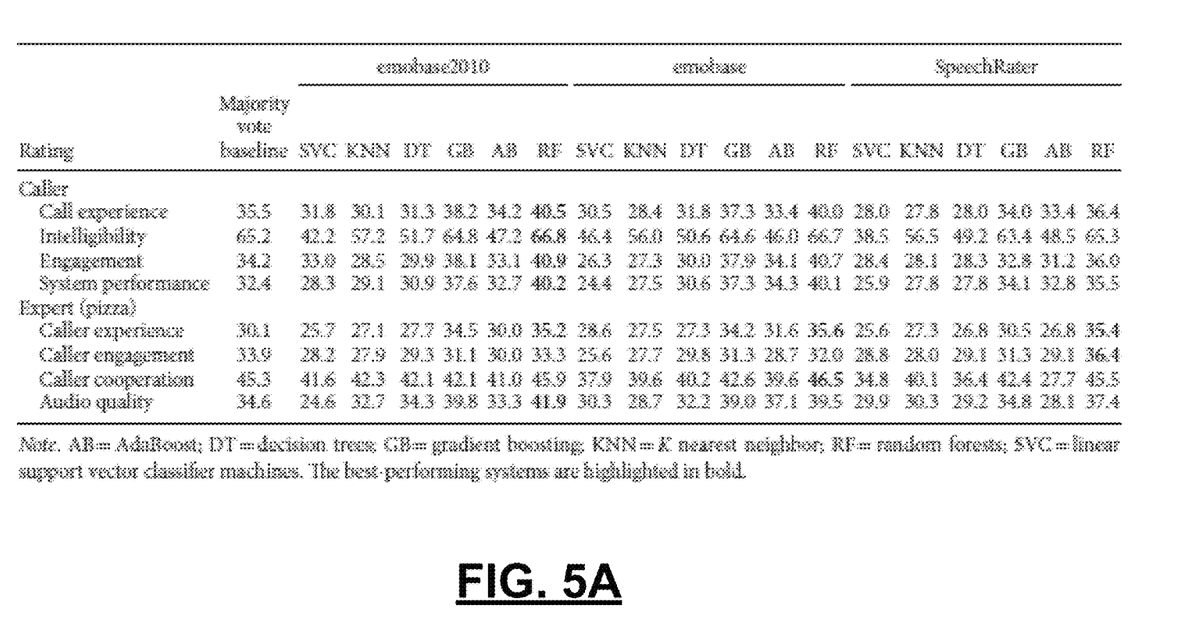
FIGS. 5A-5C present prediction accuracies for different combinations of audio, video, or audio/video features for predicting engagement metrics accessed via surveys.
Figure 5B:
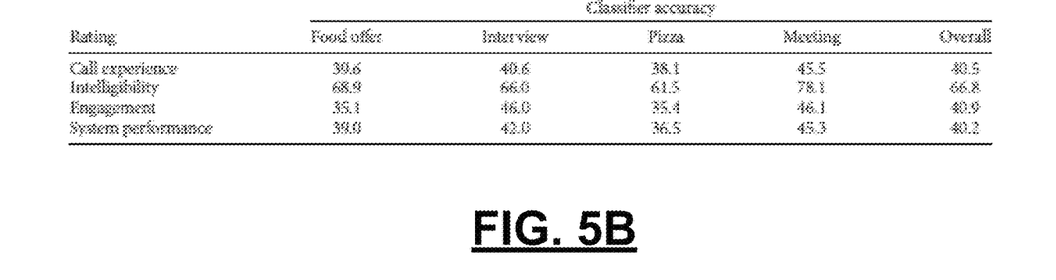
Figure 5C:
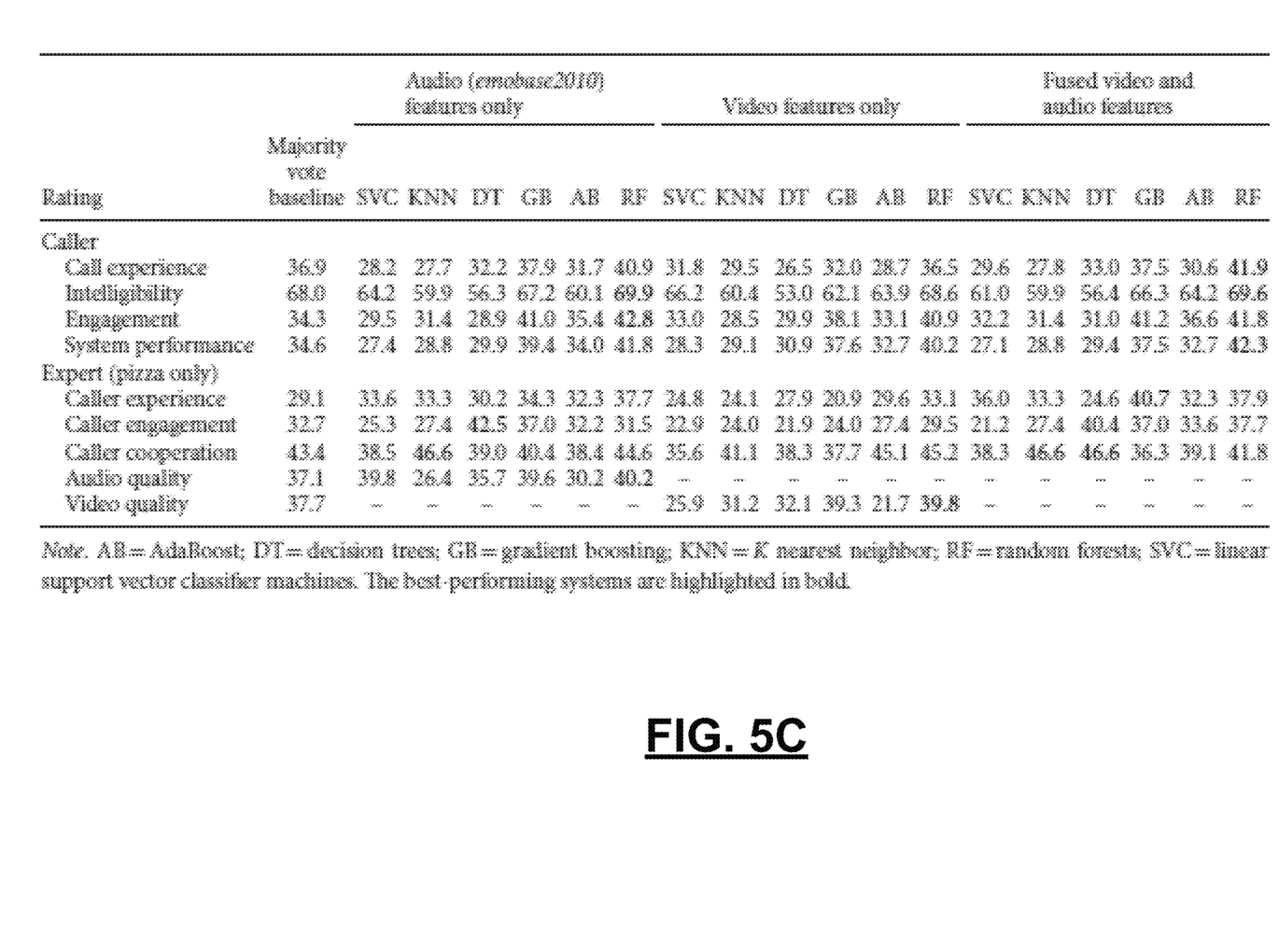

FIGS. 5A-5C present prediction accuracies for different combinations of audio, video, or audio/video features for predicting engagement metrics accessed via surveys. The best performing combinations can be selected as predictors, where different combinations can be selected for different engagement metrics—enabling a best combination of video/audio metrics to be selected for each engagement metric.

FIG. 5A depicts 10-fold classification accuracies obtained by running stratified cross-validation experiments using six different classifiers—linear SVC machines, KNN, decision trees, gradient boosting, AdaBoost, and random forests (RF)—on each feature set extracted from the audio corresponding to each dialog turn. Although performance metrics are rated at the level of the full-call recording, the engagement model generator 124 assigns the same rating to the audio associated with each dialog turn of that full-call recording for the purposes of this experiment. FIG. 5A illustrates that the RF classifier generally performs best in most cases, while the best performance is obtained using the emobase2010 feature set. While emobase and SpeechRater perform only marginally worse, they are increasingly lower dimensional as compared to the emobase2010 feature set and therefore might find utility in some applications. Additionally, the best performing system for each rating significantly outperforms the majority vote baseline (i.e., the odds of randomly selecting a value and matching the survey acquired engagement metric).

FIG. 5B provides insight into how different tasks performed on the caller ratings prediction task for the emobase2010 feature set and a RF classifier. The accuracies were higher than average for a meeting and interview tasks as compared to pizza and food offer tasks. This trend can be explained by the longer duration of utterances in the interview and meeting scheduling tasks, soliciting more elaborate user input.

FIG. 5C depicts results of experiments performed at the level of the full-call recording. For this level of analysis, the engagement model generator 124 only considered the best performing audio feature—the emobase2010 feature set extracted using OpenSMILE—as opposed to all three speech feature sets examined in FIG. 5A. Furthermore, the engagement model generator 124 only tested audio-only features to predict audio quality ratings and video-only features to predict video-only ratings. It is observed that (a) the best performing feature sets outperform the majority vote baseline in all rating categories, while (b) RF classifiers still perform well for this experiment, and other classifiers, such as the KNN, DT, and GB, also perform competently in predicting certain ratings; moreover, (c) the fusion of emobase2010 audio- and video-based 3D SIFT bag-of-visual-words features performs better than audio or video features alone.

Figure 6A:
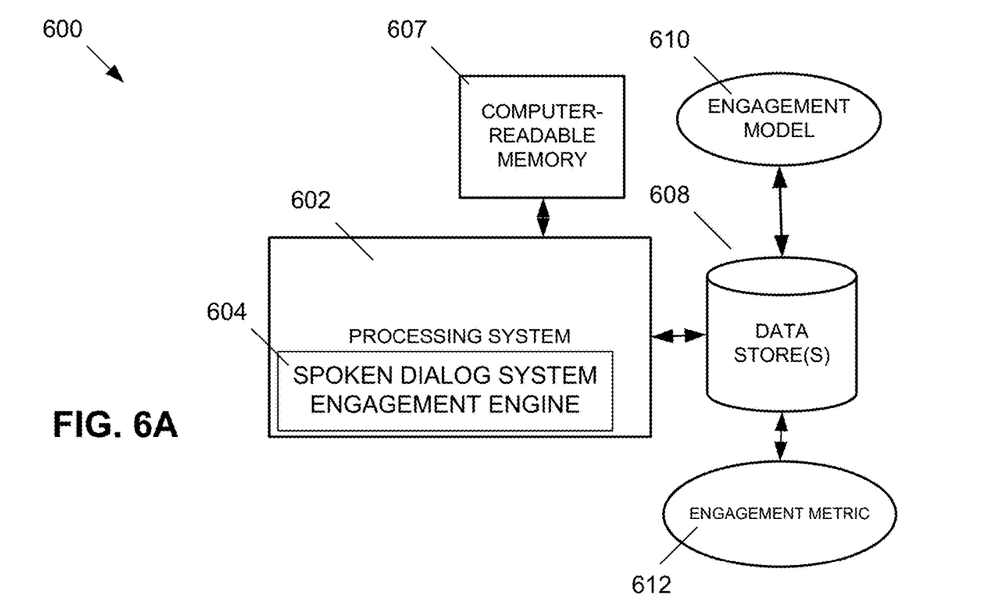
FIGS. 6A, 6B, and 6C depict example systems for implementing the approaches described herein for implementing a spoken dialog system engagement engine.
Figure 6B:
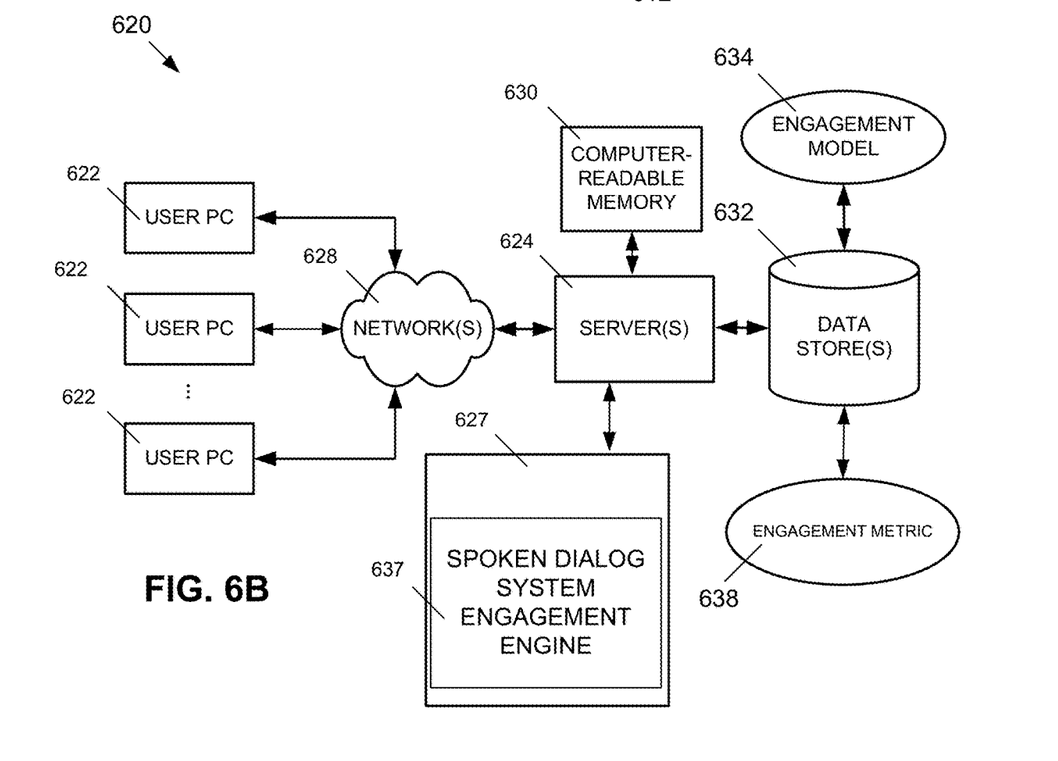
Figure 6C:
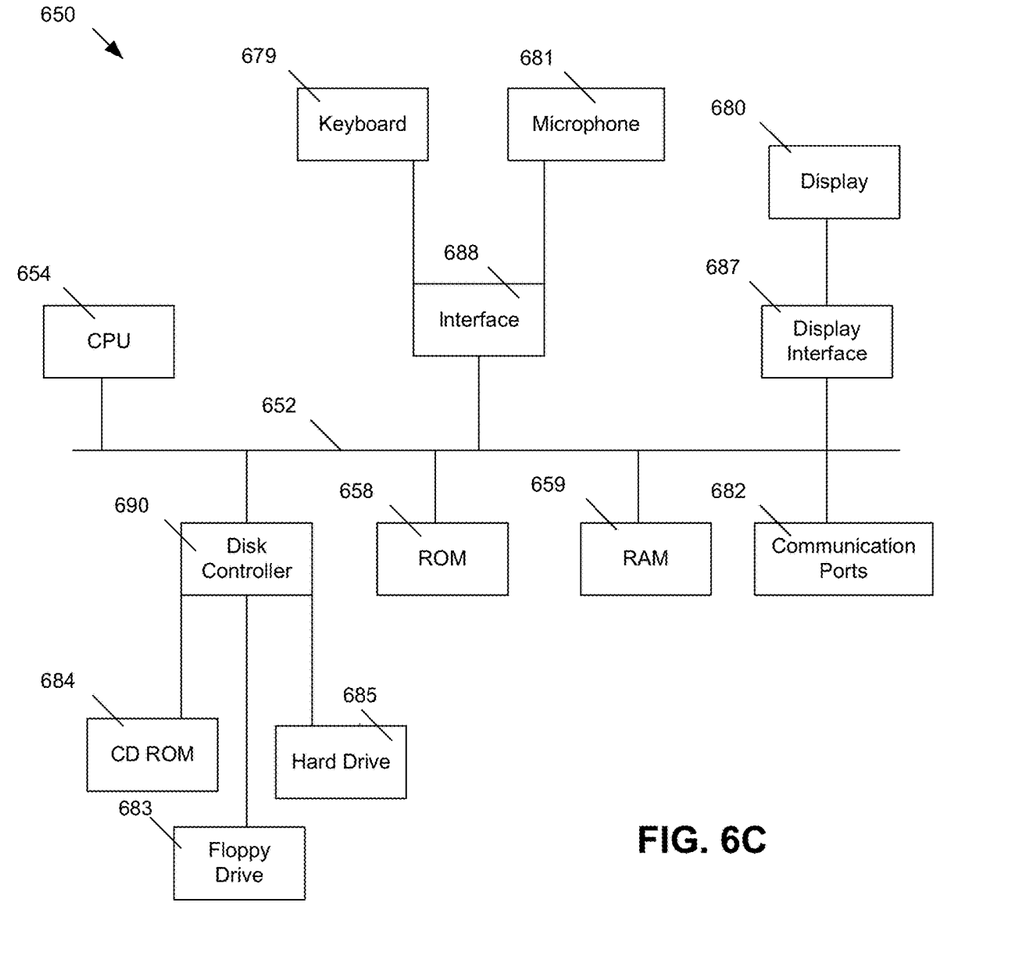

FIGS. 6A, 6B, and 6C depict example systems for implementing the approaches described herein for implementing a spoken dialog system engagement engine. For example, FIG. 6A depicts an exemplary system 600 that includes a standalone computer architecture where a processing system 602 (e.g., one or more computer processors located in a given computer or in multiple computers that may be separate and distinct from one another) includes a computer-implemented spoken dialog system engagement engine 604 being executed on the processing system 602. The processing system 602 has access to a computer-readable memory 607 in addition to one or more data stores 608. The one or more data stores 608 may include an engagement model 610 as well as an engagement metric 612. The processing system 602 may be a distributed parallel computing environment, which may be used to handle very large-scale data sets.

FIG. 6B depicts a system 620 that includes a client-server architecture. One or more user PCs 622 access one or more servers 624 running a computer-implemented spoken dialog system engagement engine 637 on a processing system 627 via one or more networks 628. The one or more servers 624 may access a computer-readable memory 630 as well as one or more data stores 632. The one or more data stores 632 may include an engagement model 634 as well as an engagement metric 638.

FIG. 6C shows a block diagram of exemplary hardware for a standalone computer architecture 650, such as the architecture depicted in FIG. 6A that may be used to include and/or implement the program instructions of system embodiments of the present disclosure. A bus 652 may serve as the information highway interconnecting the other illustrated components of the hardware. A processing system 654 labeled CPU (central processing unit) (e.g., one or more computer processors at a given computer or at multiple computers), may perform calculations and logic operations required to execute a program. A non-transitory processor-readable storage medium, such as read only memory (ROM) 658 and random access memory (RAM) 659, may be in communication with the processing system 654 and may include one or more programming instructions for performing the method of providing a spoken dialog system. Optionally, program instructions may be stored on a non-transitory computer-readable storage medium such as a magnetic disk, optical disk, recordable memory device, flash memory, or other physical storage medium.

In FIGS. 6A, 6B, and 6C, computer readable memories 608, 630, 658, 659 or data stores 608, 632, 683, 684, 688 may include one or more data structures for storing and associating various data used in the example systems for implementing a computer-implemented spoken dialog system engagement engine. For example, a data structure stored in any of the aforementioned locations may be used to store data from XML files, initial parameters, and/or data for other variables described herein. A disk controller 690 interfaces one or more optional disk drives to the system bus 652. These disk drives may be external or internal floppy disk drives such as 683, external or internal CD-ROM, CD-R, CD-RW or DVD drives such as 684, or external or internal hard drives 685. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 690, the ROM 658 and/or the RAM 659. The processor 654 may access one or more components as required.

A display interface 687 may permit information from the bus 652 to be displayed on a display 680 in audio, graphic, or alphanumeric format. Communication with external devices may optionally occur using various communication ports 682.

In addition to these computer-type components, the hardware may also include data input devices, such as a keyboard 679, or other input device 681, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A processor-implemented method for providing a spoken dialog system, comprising:
   providing an engagement engine comprising a spoken dialog system configured to have a conversation with a person;
   providing an output from the spoken dialog system to the person, wherein the output is intended to prompt a plurality of responses from the person;
   capturing audio and video data of the person's responses to the output;
   extracting audio and video features from the audio and video data, wherein the audio and video features are indicative of the person's level of engagement with the spoken dialog system;
   deriving a plurality of engagement metrics from the audio and video features, wherein the plurality of engagement metrics are indicative of the level of the person's engagement with the spoken dialog system;
   deriving additional engagement metrics based on a quality of the person's responses; and
   adjusting the spoken dialog system during the conversation, based a combination of the plurality of engagement metrics derived from the audio features, the video features, and the quality of the person's responses to improve the person's level of engagement with the spoken dialog system, the adjusting comprising displaying at least one of a picture or a video when the engagement metrics indicate that the level of the person's engagement with the spoken dialog system is below a pre-defined threshold.

2. The method of claim 1, wherein the plurality of engagement metrics are not indicative of a level of correctness of any speech content received from the person.

3. The method of claim 1, wherein deriving the plurality of engagement metrics comprises calculating a scale-invariant feature transform across a plurality of frames of the video data.

4. The method of claim 3, wherein the scale-invariant feature transform tracks temporal evolution of a captured feature of the person across the plurality of frames of the video data.

5. The method of claim 4, wherein the captured feature is associated with corners or edges represented in the video data or the person's nose, mouth, eye, ear, or hand.

6. The method of claim 1, wherein deriving the plurality of engagement metrics comprises identifying a number of frames in which a captured feature of the person appears in the video data.

7. The method of claim 6, further comprising calculating a histogram of occurrences of clusters of captured features of the person in frames of the video data.

8. The method of claim 1, wherein the plurality of engagement metrics comprises multiple metrics including two or more of: conversation experience, intelligibility, system performance, and cooperation of the person.

9. The method of claim 1, wherein the plurality of engagement metrics comprises an audio engagement metric and a video engagement metric.

10. The method of claim 1, wherein the output from the spoken dialog system is provided via a computer system, wherein the video data is captured via the computer system.

11. The method of claim 9, wherein the spoken dialog system is adjusted during the conversation, based on the audio engagement metric.

12. The method of claim 1, wherein the spoken dialog system is further adjusted after the conversation, based on the plurality of engagement metrics.

13. The method of claim 9, wherein the spoken dialog system is adjusted during the conversation, based on the video engagement metric.

14. The method of claim 1, wherein the plurality of engagement metrics are used to generate a performance score for the person.

15. The method of claim 1, wherein the conversation with the person is part of an interview process for employment.

16. The method of claim 15, wherein the conversation is associated with an initial screening for the job interview process, wherein the person is a candidate for employment.

17. The method of claim 1, wherein the spoken dialog system includes a video avatar, wherein the video avatar is animated as part of the conversation.

18. The method of claim 1, wherein the spoken dialog system is a multi-modal dialog system.

19. The method of claim 1, where the plurality of engagement metrics further comprises a correctness metric, wherein the correctness metric is indicative of a level of correctness of at least a portion of speech content received from the person.

20. A computer-implemented system for providing a spoken dialog system, comprising:
   one or more data processors;
   a computer-readable medium encoded with instructions for commanding the one or more data processors to execute steps comprising:
      providing an engagement engine comprising a spoken dialog system configured to have a conversation with a person;
      providing an output from the spoken dialog system to the person, wherein the output is intended to prompt a plurality of responses from the person;
      capturing audio and video data of the person's responses to the output;
      extracting audio and video features from the audio and video data, wherein the audio and video features are indicative of the person's level of engagement with the spoken dialog system;
      deriving a plurality of engagement metrics from the audio and video features, wherein the plurality of engagement metrics are indicative of the level of the person's engagement with the spoken dialog system;
      deriving additional engagement metrics based on a quality of the person's responses; and
      adjusting the spoken dialog system during the conversation, based a combination of the plurality of engagement metrics derived from the audio features, the video features, and the quality of the person's responses to improve the person's level of engagement with the spoken dialog system, the adjusting comprising displaying at least one of a picture or a video when the engagement metrics indicate that the level of the person's engagement with the spoken dialog system is below a pre-defined threshold.

21. A non-transitory computer-readable medium encoded with instructions for commanding one or more data processors to execute steps of a method for providing a spoken dialog system, the steps comprising:

provide an engagement engine comprising a spoken dialog system configured to have a conversation with a person;

providing an output from the spoken dialog system to the person, wherein the output is intended to prompt a plurality of responses from the person;

capturing audio and video data of the person's responses to the output;

extracting audio and video features from the audio and video data, wherein the audio and video features are indicative of the person's level of engagement with the spoken dialog system;

deriving a plurality of engagement metrics from the audio and video features, wherein the plurality of engagement metrics are indicative of the level of the person's engagement with the spoken dialog system;

deriving additional engagement metrics based on a quality of the person's responses; and adjusting the spoken dialog system during the conversation, based a combination of the plurality of engagement metrics derived from the audio features, the video features, and the quality of the person's responses to improve the person's level of engagement with the spoken dialog system, the adjusting comprising displaying at least one of a picture or a video when the engagement metrics indicate that the level of the person's engagement with the spoken dialog system is below a pre-defined threshold.

22. The method of claim 9, wherein the video engagement metric is derived without consideration of the audio features, and wherein the audio engagement metric is derived without consideration of the video features.

23. The method of claim 1, wherein the adjustments made to the spoken dialog system are applied to subsequent conversations.

24. The method of claim 1, further comprising:

identifying correlations between the extracted audio and video features and the plurality of engagement metrics; and applying the identified correlations to subsequent conversations.

* * * * *